United States Patent [19]

Salvi et al.

[11] Patent Number: 4,477,909

[45] Date of Patent: Oct. 16, 1984

[54] UNSTABLE OPTICAL RESONATOR WITH CANCELLING EDGE WAVES

[75] Inventors: Theodore C. Salvi; Martin E. Smithers, both of Albuquerque, N. Mex.; Gregory C. Dente, Bethel, Conn.

[73] Assignee: The United States of America as represented by the Secretary of the Air Force, Washington, D.C.

[21] Appl. No.: 353,981

[22] Filed: Mar. 2, 1982

[51] Int. Cl.$^3$ .............................................. H01S 3/08
[52] U.S. Cl. ........................................ 372/95; 372/98; 372/103; 372/108; 372/99
[58] Field of Search .................... 372/95, 98, 101, 103, 372/108

[56] References Cited

U.S. PATENT DOCUMENTS

| | | | |
|---|---|---|---|
| 3,950,712 | 4/1976 | Chenausky et al. | 331/94.5 |
| 4,025,172 | 5/1977 | Freiberg | 350/294 |
| 4,050,036 | 9/1977 | Chambers et al. | 331/94.5 |
| 4,096,447 | 6/1978 | Fluhr | 331/94.5 |
| 4,156,209 | 5/1979 | Herbst et al. | 372/101 |

OTHER PUBLICATIONS

McAllister, "Improved Mode Properties of Unstable Resonators with Tapered Reflectivity Mirrors and Shaped Apertures"; *IEEE Jour. Quart. Elect.* vol. QE 10, No. 3, Mar., 1974.

Smithers, "Unstable Resonator with Cancelling Edge Waves"; *Applied Optics* vol. 21, No. 4, Feb. 15, 1982.

*Primary Examiner*—William L. Sikes
*Assistant Examiner*—Léon Scott, Jr.
*Attorney, Agent, or Firm*—Donald J. Singer; Jacob N. Erlich

[57] ABSTRACT

A structural improvement to the feedback (i.e., output) mirror of an unstable optical resonator. The improvement may comprise either a step-like projection (either convex or concave) on the internal surface of the feedback mirror, or a change in curvature of the internal surface of the mirror. Each of these improvements actually constitutes a discontinuity in the internal surface of the mirror, with the curvature of the mirror on either side (i.e., around) the improvement remaining the same. The improvement cancels the interfering edge waves at the geometric source point of the resonator, thereby minimizing the effect of edge diffraction, and results in yielding more "geometric" modes having relatively uniform intensity profiles and large differences in feedback ratios between the dominant and higher-order modes.

8 Claims, 8 Drawing Figures

UNSTABLE OPTICAL RESONATOR WITH CANCELLING EDGE WAVES

STATEMENT OF GOVERNMENT INTEREST

The invention described herein may be manufactured and used by or for the Government for governmental purposes without the payment of any royalty thereon.

BACKGROUND OF THE INVENTION

The invention relates to unstable optical resonators and, more particularly, to an improvement to a mirror thereof, whereby interfering edge waves travelling from the mirror toward the geometric source point of the resonator cancel the edge wave from the output mirror of the resonator.

Unstable optical resonators offer higher extraction efficiency combined with good beam quality. They are distinguished by an output that expands around rather than passing through the output mirror. Diffractive scattering back into the resonator from the sharp aperture at the edge of the output mirror significantly affects the mode structure of such resonators. An analysis which neglects edge diffraction yields a lowest-order mode that has uniform intensity and is substantially favored over higher-order modes. The effect of edge diffraction is to add structure to the amplitudes of the modes and to change their relative feedback ratios. Mode crossing of the dominant mode as a function of equivalent Fresnel number also occurs.

Prior art attempts to reduce the effect of edge diffraction on the resonator mode have included the use of rounded edges, serrated edges, and zero equivalent length. All of these attempts have well known serious drawbacks.

Accordingly, what is still needed in the art, but as yet is not available, is some means for reducing the effect of edge diffraction on resonator modes, with the means also eliminating (or, at least, greatly reducing) any drawbacks.

SUMMARY OF THE INVENTION

This invention provides a structural improvement to the unstable optical resonator that fulfills the above mentioned need. The novel and unique concept which is the basis of the instant invention is the introduction of a structural discontinuity in the internal surface of the feedback (i.e., output) mirror. This structural discontinuity, which may be either a discontinuity in position or a discontinuity in slope, then serves as another source of edge waves that interfere with the waves from the output edge of the feedback mirror. It is here to be noted that it is the light which is scattered back in the direction of the virtual geometric source point (on the optical axis) of the resonator that has the greatest effect on the modes. Thus, the position and strength of the inventive, internal, structural discontinuity have been chosen to produce cancellation of the edge waves at the geometric source point. This reduces the effect of edge diffraction, and yields more "geometric" modes having relatively uniform intensity profiles and large differences in feedback ratios between the dominant and higher order modes. Therefore, the instant invention constitutes a significant advance in the state-of-the-art.

Accordingly, it is the principal object of this invention to teach a structural improvement of the feedback (i.e., output) mirror of an unstable optical resonator which will cause the cancelling out of interfering edge waves.

It is another object of the instant invention to provide a feedback mirror which has a discontinuity in position in its internal surface which will cancel the interfering edge waves.

It is still another object of this invention to provide a feedback mirror where the above-mentioned discontinuity in position comprises a projection from the internal surface of the mirror, where the projection is step-like in shape.

It is a further object of the instant invention to teach that a structural discontinuity of the surface of the feedback mirror which will cause the cancellation of interfering edge waves can comprise a discontinuity in slope of the feedback mirror.

These objects of this invention, as well as other related objects thereof, will become readily apparent after a consideration of the description of the invention, together with reference to the contents of the Figures of the drawing.

DESCRIPTION OF THE INVENTIVE IMPROVEMENT

Figure 1:
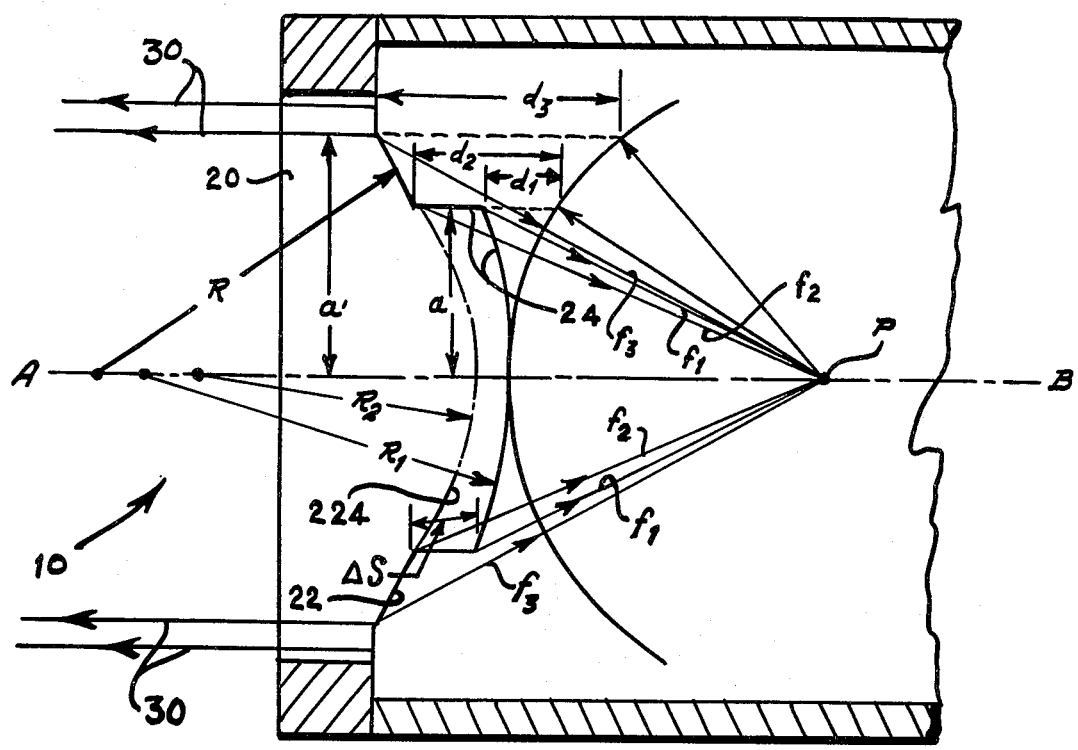
FIG. 1 is a side elevation view, in simplified schematic and pictorial form, partially fragmented and partially in cross section, of a representative unstable optical resonator which incorporates the instant invention, i.e., the inventive improvement to the feedback (i.e., output) mirror.
Figure 2:
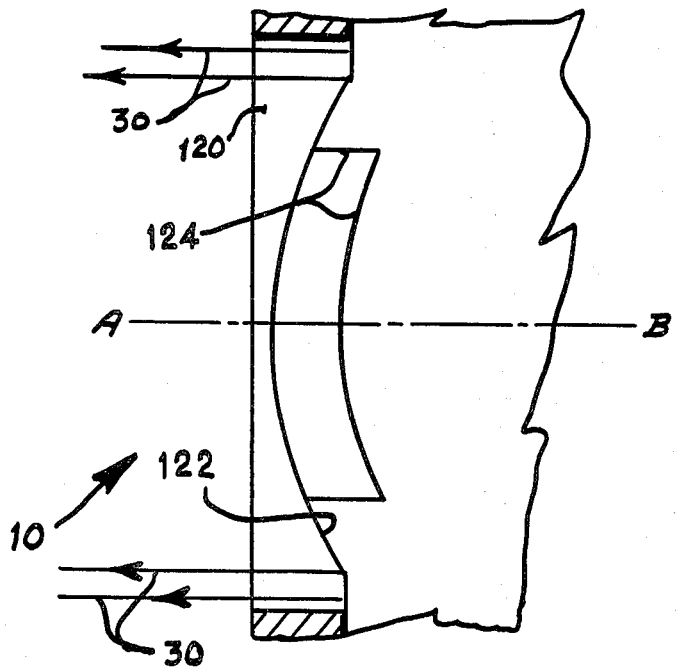
FIG. 2 is a side elevation view, in simplified schematic and pictorial form, partially fragmented and partially in cross section, of the representative unstable optical resonator which incorporates a variation of the instant invention.

With reference to FIGS. 1 and 2, therein is shown in a side elevation view, partially in cross section and partially fragmented, an unstable optical resonator 10. For illustrative purposes only, the unstable optical resonator 10 is to be assumed to be for use in laser application. In this regard, it is to be understood that the term "optical", as used hereinbefore and as used hereinafter, is intended to mean, as it does in the art, those frequencies (and wavelengths) of the electromagnetic spectrum which are in the ultraviolet, visible, and infrared portions thereof.

The unstable optical resonator 10 is shown in FIG. 1 as having an output (i.e., feedback) mirror 20 with an internal surface 22, an output beam 30 (schematically represented by its edge rays) of a known wavelength (and frequency), an optical axis A—B, and a virtual geometric source point P which is at a known location (i.e., position) on and along the optical axis A—B. In FIG. 2, the unstable optical resonator 10 is similarly shown, except: that, because the output mirror is of a different configuration, the mirror is designated 120 and its internal surface is 122; and that, in the interest of maintaining the simplicity of FIG. 2, the geometric source point P is omitted.

Succinctly, the inventive improvement comprises a structural discontinuity of the internal surface (22, FIG. 1, and 122, FIG. 2) of the output (i.e., feedback) mirror (20, FIG. 1, and 120, FIG. 2). The structural discontinuity may comprise a discontinuity in position (FIGS. 1-5, inclusive) or in slope (in phantom in FIG. 1). More specifically, the structural discontinuity in position may comprise, in turn, a projection (such as 24, FIG. 1; 124, FIG. 2) from the internal surface of the feedback mirror, with the projection being step-like in shape and having an internal surface with the same radius of curvature as the internal surface of the feedback mirror. It is to be noted that the projection 24, FIG. 1, has a convex front surface; whereas, the projection 124, FIG. 2, has a concave front surface. On the other hand, the structural discontinuity in slope (such as 224, shown in phantom in FIG. 1) is from the internal surface of the feedback mirror, with the projection having an internal surface with a radius of curvature $R_2$ different than the radius of curvature $R$ of the feedback mirror.

Again with reference to FIG. 1, it is to be noted that as a matter of preference and not of limitation, and that in the interest of presenting an explanation that is understandable even by those not of the art, the improvement of the instant invention which comprises the projection 24 in FIG. 1 will be described and discussed in detail greater than needed to make and use the inventive improvement, and in greater detail than the variations thereof (i.e., projections 124, FIG. 4, and 224, FIG. 1) will be discussed.

It is also to be noted that, in those situations where the inventive improvement is to be used, the unstable optical resonator 10, the output mirror 20, and the inventive step-like projection 24 and 124 have a common axis, such as A—B, FIGS. 1 and 2; that the output mirror 20 has a known (or preselected, or ascertainable) equivalent Fresnel number, that the outside edge of the mirror 20 is at a known (or preselected, or ascertainable) distance (such as a', FIG. 1) outwardly from the optical axis A—B; that the radius of curvature (such as R, FIG. 1) of the internal surface 22 of the mirror 20 is known (or preselected, or ascertainable); that the wavelength (and frequency) of the output beam (such as 30, FIG. 1) of the resonator 10 is known (or is preselected, or is ascertainable); and that the virtual geometric source point P of the output beam 30 is at a known (or preselected, or ascertainable) location or position on or along the optical axis A—B.

With the configuration shown in FIG. 1, there are actually three (3) surface discontinuities (e.g., apertures). They are the (outside) edge of the proposed step-like projection 24; the inside edge of the inner surface 22 of the mirror 20; and the (outside) edge of the inner surface 22 of the mirror 20. More precisely, the three edges are: the circumference of the edge of the proposed step-like projection 24; the circumference of the base of the proposed step-like project 24 (which abuts the inner surface 22 of the mirror 20); and, the circumference of the outside edge of the mirror 20 (i.e., the circumference of the surface 22 of the mirror 20). These three (3) edges each give rise to a separate and distinct interfering edge wave, i.e., a total of three (3) edge waves. Because the edges are circumferences the interfering edge waves are in the nature of cones; and, therefore, are shown in side elevation in FIG. 1 by their respective two sets of defining and limiting rays. More specifically, the two rays designated $f_1$, FIG. 1, represent the first interfering edge wave and it travels from the first aperture (i.e., the edge of the proposed step-like projection 24) to the virtual geometric source point P of the output beam 30; the two rays designated $f_2$, FIG. 1, represent the second interfering edge wave and it travels from the second aperture (i.e., the inside edge of the inner surface 22 of the mirror 20) to the virtual geometric source point P of the output beam 30; and the two rays designated $f_3$, FIG. 1, represents the third interfering edge wave and it travels from the third aperture (i.e., the outside edge of the inner surface 22 of the mirror) to the virtual geometric source point P of the output beam 30.

Since the equivalent Fresnel number of the resonator 10 can be interpreted geometrically as twice the distance in wavelengths between the edge of the feedback mirror 20 and the output wave incident at the feedback mirror, then if $N_{eq}$ is the equivalent Fresnel number for the inner edge (i.e., the edge of the front surface of the step-like projection 24), and $N_{eq}'$ is the equivalent Fresnel number for the outer aperture (i.e., the edge of the inner surface 22 of the mirror 20), these respective equivalent Fresnel numbers are related by the equation:

$$N_{eq}'/N_{eq} = a'^2/a^2$$

The relative optical path length for the three edge waves $f_1$, $f_2$, and $f_3$, travelling in the direction of the source point P of the output beam 30, are:

$$d_1 = N_{eq}\lambda \text{ (for } f_1\text{)}$$

$$d_2 = N_{eq}\lambda + 2\Delta S \text{ (for } f_2\text{) and}$$

$$d_3 = N_{eq}'\lambda + 2\Delta S \text{ (for } f_3\text{)}$$

For a uniform output wave, the three edge waves $f_1$, $f_2$, and $f_3$ have equal amplitudes, but have different phases; and, thus, may be written in the form, assuming unit amplitudes:

$$f_1 = -e^{-i2\pi N_{eq}}$$

$$f_2 = e^{-i2\pi(N_{eq} + 2\Delta S/\lambda)}$$

$$f_3 = -e^{-i2\pi(N_{eq}' + 2\Delta S/\lambda)}$$

The edge wave $f_2$ has a different sign, because it is produced at an inside edge; and, this difference in sign allows for the cancellation of $f_1$ and $f_2$ when $\Delta S = 0$.

As a result, the requirement (i.e., desired objective) of cancellation of the three interfering edge waves $f_1$, $f_2$, and $f_3$ at the virtual geometric source point P imposes the conditions:

$$\Delta S = \pm \lambda/12 + n_1 \lambda/2$$

and $$N_{eq}' = N_{eq} \pm 1/6 + n_2$$

It is to be noted that $n_1$, and $n_2$ are positive or negative intergers or zero, and the signs which are chosen must be the same when used in the two equations hereinabove (i.e., as to $\Delta S$ and $N_{eq}'$).

Accordingly, all of the foregoing equations are used to solve for $\Delta S$ (i.e., the height of the step-like projection 24, FIG. 1), and for a (i.e., the outwardly extending distance location of the step-like projection 24, FIG. 1); and the resultant step-like projection, which is then formed on the internal surface 22 of mirror 20 in accordance with the ascertained lengths $\Delta S$ and a and the known radius of curvature R (where $R_1$, FIG. 1, equals R), is the step-like projection 24 which, in turn, results in the cancellation of the interfering first, second, and third edge waves $f_1$, $f_2$, and $f_3$.

TEST AND RESULTS

Although the edge wave cancellation approach which is the basis of the instant invention, and which has been discussed hereinabove, yields the scientific and mathematical conditions for cancellation of the edge waves, the use of the approach cannot predict how well a resonator (such as 10, FIG. 1) incorporating such a structured feedback mirror will actually perform. To obtain the mode structure of the resonator, a complete diffractive calculation must be performed. The applicants have completed such a bare cavity analysis, and the results were satisfactory, as expected.

Figure 3:
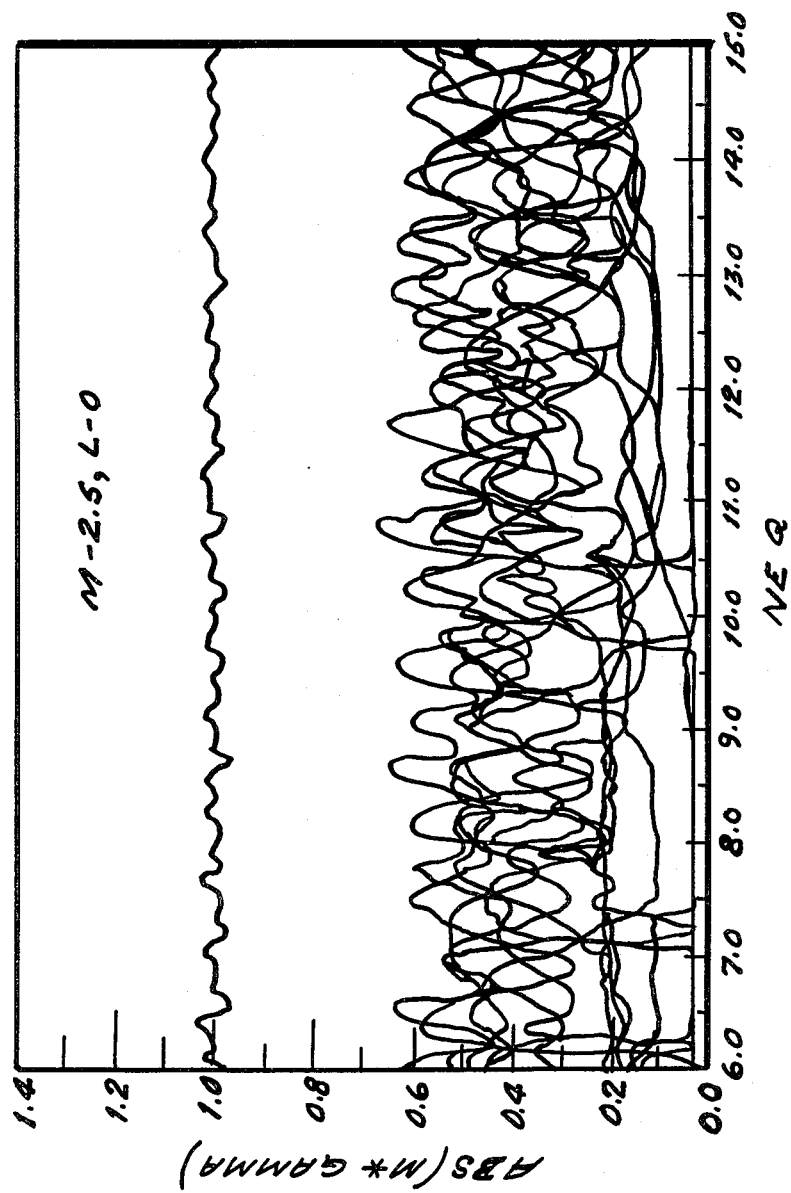
FIG. 3 is a representation, in graph form, of the relative eigenvalue as compared to the equivalent Fresnel number for the outside edge of a feedback mirror having the inventive structural improvement (i.e., the step-like projection shown in FIG. 1,) wherein the azimuthal eigennumber $l=0$.
Figure 4:
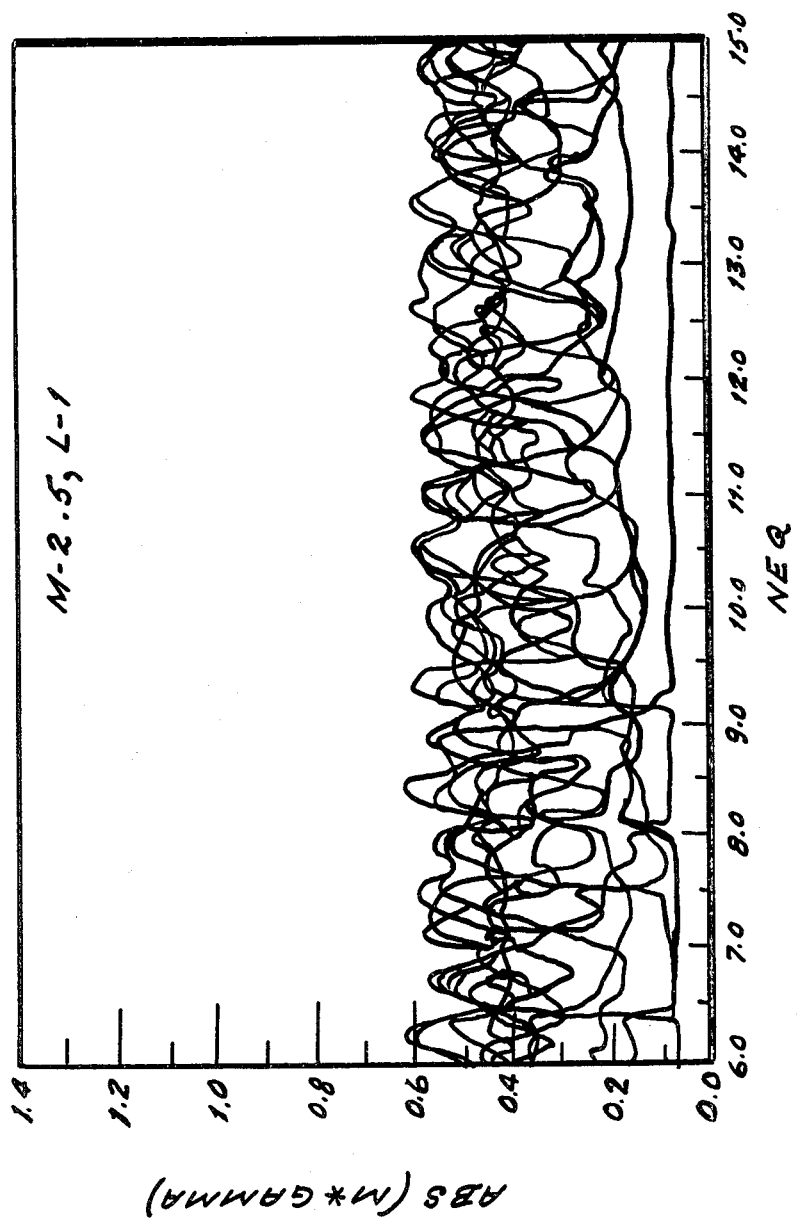
FIG. 4 is a representation, in graph form, of the relative eigenvalue as compared to the equivalent Fresnel number for the outside edge of a feedback mirror having the inventive structural improvement (i.e., the step-like projection shown in FIG. 1) wherein the azimuthal eigenumber $l=1$.
Figure 5:
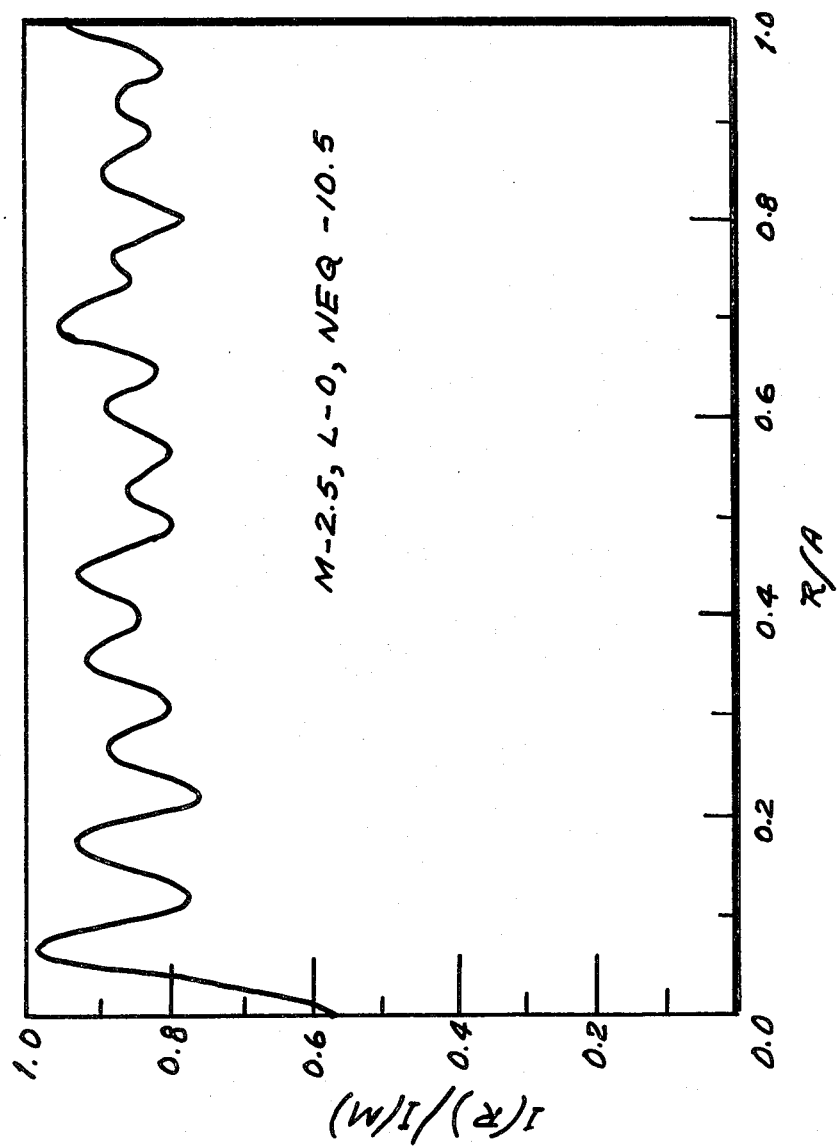
FIG. 5 is a representation, in graph form, of the relative intensity, as compared to the relative distance from the center of the feedback mirror having the inventive structural improvement (i.e., the step-like projection shown in FIG. 1)
Figure 6:
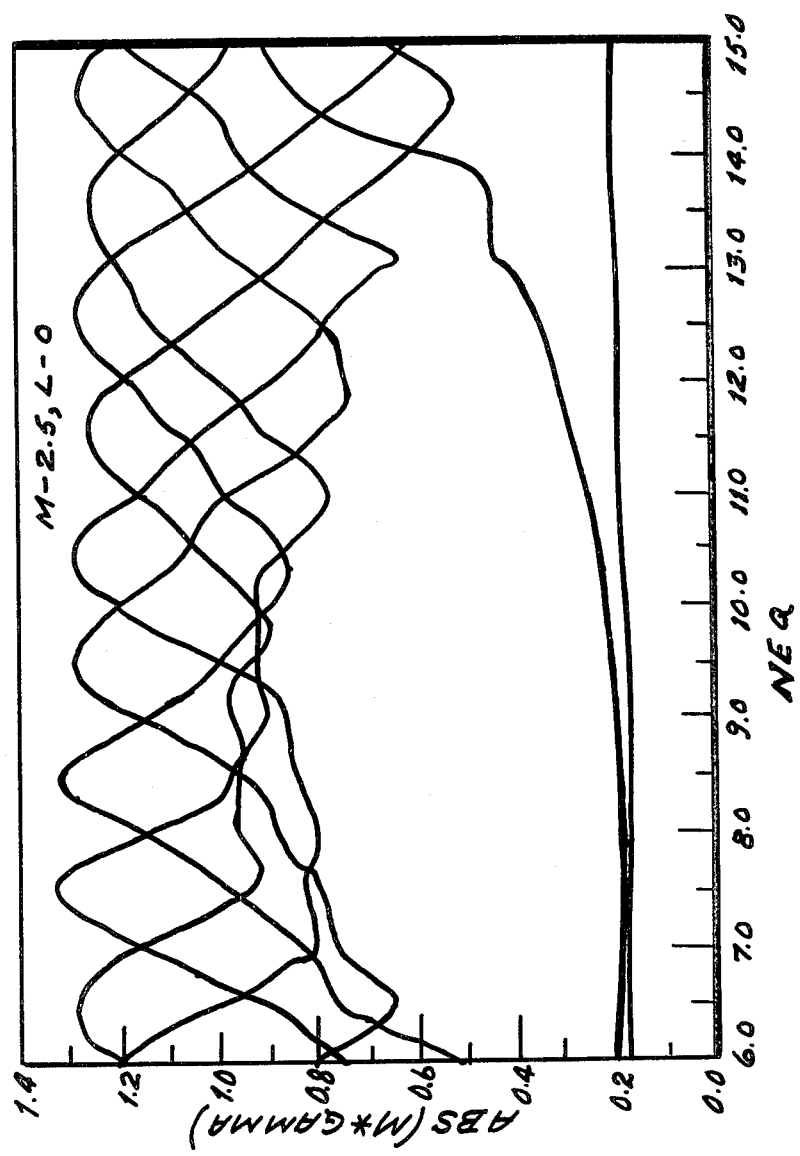
FIG. 6 is a representation, in graph form, of the relative eigenvalues, as compared to the equivalent Fresnel number for a conventional feedback mirror, wherein the azimuthal eigenumber $l=0$ (compare with FIG. 3)
Figure 7:
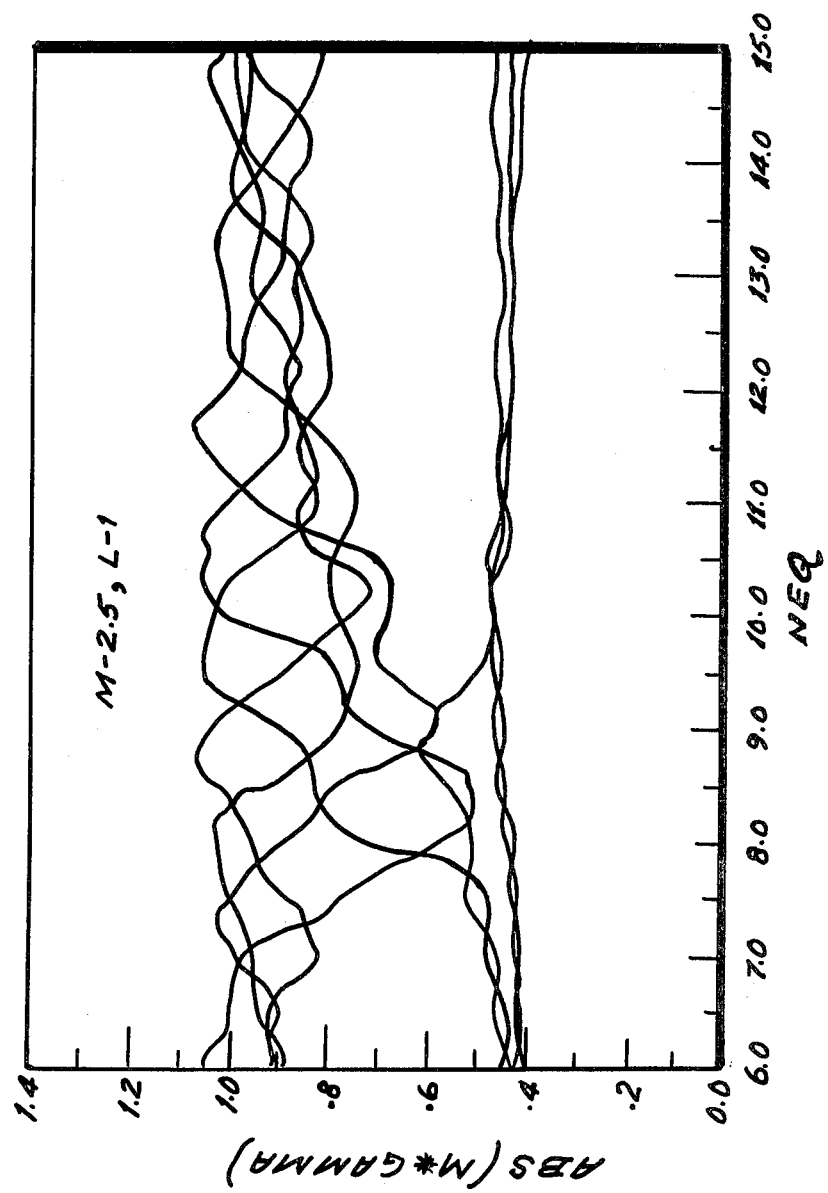
FIG. 7 is a representation, in graph form, of the relative eigenvalues as compared to the equivalent Fresnel number for a conventional feedback mirror, wherein the azumuthal eigennumber $l=1$ (compare with FIG. 4)
Figure 8:
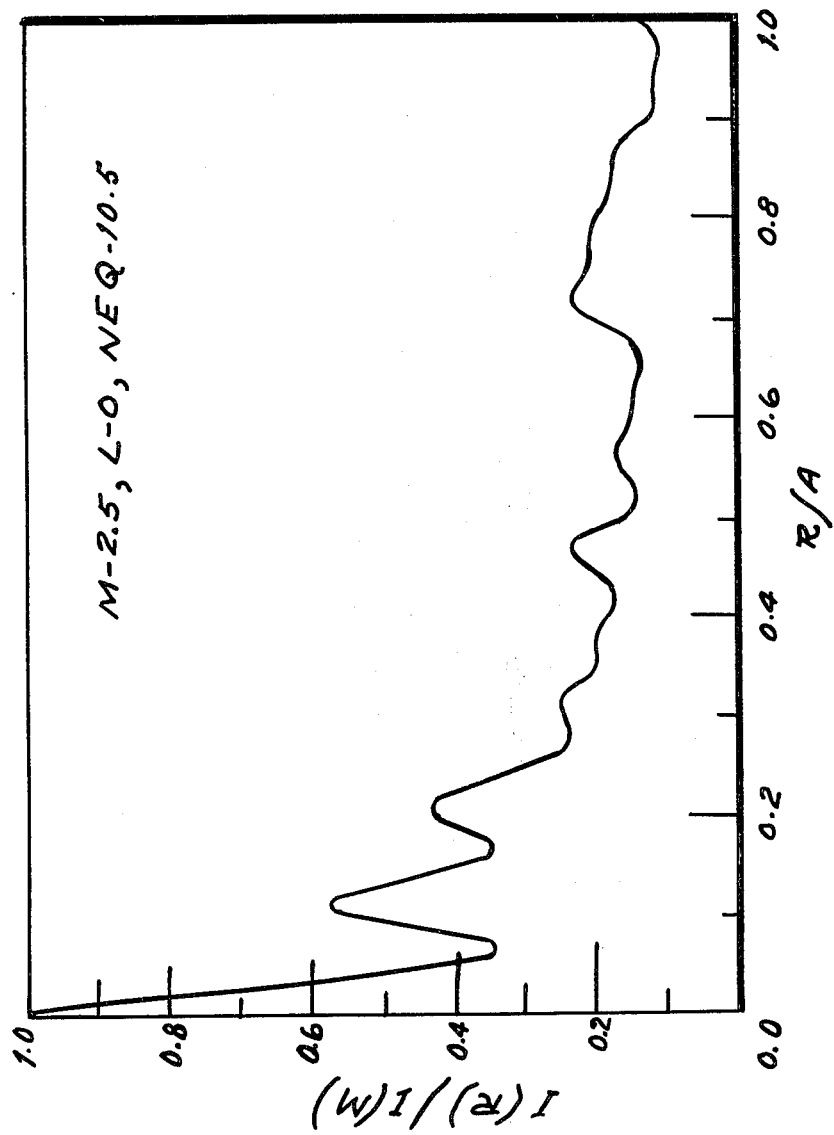
FIG. 8 is a representation, in graph form, of the relative intensity, as compared to the relative distance from the center of a conventional feedback mirror (compare with FIG. 5).

More specifically, a compact half-symmetric unstable optical resonator having a spherical convex feedback mirror with a circular aperture, such as mirror 20, FIG. 1, was used. The geometric magnification of the resonator was 2.5 and the step-like projection, such as 24, FIG. 1, of the mirror met the conditions, as set forth hereinabove, with $\Delta S = \lambda/12$ and $N_{eq}' = N_{eq} + 1/6$. Plots of the numerical results are shown in FIGS. 3, 4, and 5. For the purpose of comparison, plots of the results obtained for a corresponding conventional unstable optical resonator (i.e., one not using the instant invention) are shown in FIGS. 6, 7, and 8. FIGS. 3 and 6 ae plots of relative eigenvalue $\gamma$ times the geometric magnification M for the $l=0$ azimuthal mode and FIGS. 4 and 7, for the $l=1$ azimuthal mode. Note that in FIG. 3 for the step-like projection configuration the dominant mode was detached, while in FIG. 6 for the conventional configuration typical (and undesired) mode crossing occurred. Also, in FIG. 3, the feedback eigenvalue was close to the geometric value 1/M, while in FIG. 6 the feedback eigenvalues were increased due to diffractive feedback. Comparing FIG. 3 and 4 with FIGS. 6 and 7, it is to be noted that the step-like projection configuration has slightly better discrimination between azimuthal modes. This, the applicants have found, depends on the geometric magnification M, improving with increasing M, as expected for a more "geometric" mode.

FIGS. 5 and 8 are plots of relative intensity of the output wave at a feedback mirror as compared to, relative distance from the center. The conventional configurated resonator (FIG. 8) had the characteristic spike on axis for half-integral equivalent Fresnel number. The step-like projection configuration (FIG. 5) had no spike, but had a relatively uniform intensity, although some less significant diffractive ripple remained. Thus, the resonator, such as 10, FIG. 1, with cencelling edge waves $f_1$, $f_2$, and $f_3$ had (and has) the advantage of a more uniform intensity profile, while maintaining good transverse mode discrimination independent of Fresnel number.

CONCLUSION

It is abundantly clear from all of the foregoing, and from the contents of the Figures of the drawings, that the stated objects, as well as related objects, of the invention have been achieved.

It is to be noted that, although there have been described and shown the fundamental and unique features of the instant invention, as applied to a preferred embodiment 24, various other embodiments, variations, adaptations, substitutions, additions, omissions, and the like may occur to, and can be made by those of ordinary skill in the art.

What is claimed is:

1. In an unstable optical resonator having an optical axis, an output mirror with an internal surface, and a virtual geometric point source at a location along said optical axis, the improvement within said unstable optical resonator comprising means in the form of a structural discontinuity incorporated on said internal surface of said output mirror for causing interfering edge waves travelling from said output mirror toward said virtual geometric point source to be cancelled as they approach said virtual geometric point source.

2. The improvement, as set forth in claim 1, wherein said discontinuity comprises a projection from said internal surface of said mirror, wherein said projection is step-like in shape.

3. The improvement, as set forth in claim 2, wherein said internal surface of said output mirror has a radius of curvature, and wherein said step-like projection has an internal surface with the same radius of curvature.

4. The improvement, as set forth in claim 3, wherein said internal surface of said output mirror and said internal surface of said step-like projection are convex.

5. The improvement, as set forth in claim 4, wherein
   a. said optical axis of said unstable optical resonator is common to said output mirror and said step-like projection of said output mirror;
   b. said step-like projection of said output mirror defines a first edge located at a distance extending outwardly from said optical axis, and said step-like projection has a height extending from the intersection of said projection with said internal surface of said output mirror to said first edge, said first edge defining a source for a first of said interfering edge waves; and with said intersection defining a second edge, said second edge defining a source for a second of said interfering edge waves;

c. said output mirror defines a third edge which is at a preselected distance outwardly from said optical axis, said third edge defining a source for a third of said interfering edge waves; and
d. said unstable optical resonator has an output beam of a known wavelength, with said first interfering edge wave travelling from said first edge toward said virtual geometric point source, said second interfering edge wave travelling from said second edge toward said virtual geometric point source, and said third interfering edge wave travelling from said third edge toward said virtual geometric point source.

6. The improvement, as set forth in claim 5, wherein said height and said outwardly extending distance of said projection are structurally defined by the equations:

$$d_1 = N_{eq}\lambda$$

$$d_2 = N_{eq}\lambda + 2\Delta S$$

$$d_3 = N_{eq}'\lambda + 2\Delta S$$

and $$f_1 = -e^{-i2\pi N_{eq}}$$

$$f_2 = e^{-i2\pi(N_{eq} + 2\Delta S/\lambda)}$$

$$f_3 = -e^{i2\pi(N_{eq}' + 2\Delta S/\lambda)}$$

and $$N_{eq}'/N_{eq} = a'^2/a^2$$

and $$\Delta S = \pm \lambda/12 + n_1\lambda/2 \quad (1)$$

$$N_{eq}' = N_{eq} \pm 1/6 + n_2 \quad (2)$$

where, in said two foregoing equations (1) and (2) the ± sign chosen is the same in each said equation; and
where, in all applicable foregoing equations:
$d_1$ = optical path length of said first interfering edge wave
$d_2$ = optical path length of said second interfering edge wave
$d_3$ = optical path length of said third interfering edge wave
$f_1$ = said first interfering edge wave
$f_2$ = said second interfering edge wave
$f_3$ = said third interfering edge wave
$N_{eq}$ = equivalent Fresnel number for said first and said second edge
$N_{eq}'$ = equivalent Fresnel number for said third edge
$a'$ = said preselected distance outwardly from said optical axis of said third edge
$a$ = said distance extending outwardly from said optical axis of said first edge
$\lambda$ = said wavelength of output beam
$\Delta S$ = said height of said projection
$n_1$ and $N_2$ = positive or negative integers or zero.

7. The improvement, as set forth in claim 3, wherein said internal surface of said output mirror and said internal surface of said step-like projection are concave.

8. The improvement, as set forth in claim 2, wherein said internal surface of said output mirror has a radius of curvature, and wherein said step-like projection has an internal surface with a different radius of curvature.

* * * * *